(12) United States Patent
Suutarinen

(10) Patent No.: US 6,219,544 B1
(45) Date of Patent: Apr. 17, 2001

(54) TELEMETRIC MEASURING OF A MOBILE TELEPHONE NETWORK

(75) Inventor: Jari Suutarinen, Tampere (FI)

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 09/091,504

(22) PCT Filed: Dec. 20, 1996

(86) PCT No.: PCT/FI96/00683

§ 371 Date: Jun. 19, 1998

§ 102(e) Date: Jun. 19, 1998

(87) PCT Pub. No.: WO97/23109

PCT Pub. Date: Jun. 26, 1997

(30) Foreign Application Priority Data

Dec. 20, 1995 (FI) .......................................... 956154

(51) Int. Cl.[7] ........................................... H04Q 7/20
(52) U.S. Cl. ..................... 455/423; 455/422; 455/424; 455/432; 455/67.1; 455/67.4
(58) Field of Search ............... 455/67.4, 67.1, 455/423, 456, 457, 440, 437, 424, 425; 379/1, 2, 26, 34

(56) References Cited

U.S. PATENT DOCUMENTS

| | | | |
|---|---|---|---|
| 5,179,722 | * | 1/1993 | Gunmar et al. ................. 455/33.1 |
| 5,214,687 | * | 5/1993 | Kansakoski et al. ............... 379/60 |
| 5,479,410 | * | 12/1995 | Paavonen .......................... 370/95.3 |
| 5,490,204 | | 2/1996 | Gulledge . |
| 5,490,285 | * | 2/1996 | Ahlenius et al. ................. 455/56.1 |
| 5,548,296 | * | 8/1996 | Matsuno ............................ 342/457 |
| 5,644,623 | * | 7/1997 | Gulledge ............................ 455/423 |
| 5,680,140 | * | 10/1997 | Loomis ............................... 342/357 |
| 5,987,306 | * | 11/1999 | Nilsen et al. ...................... 455/67.1 |

FOREIGN PATENT DOCUMENTS

93/15569  8/1993  (WO) .

OTHER PUBLICATIONS

Mauly—Pautet, "The GSM System for Mobile Communications", Figure 4.19, pp. 220–221.

* cited by examiner

Primary Examiner—Thanh Cong Le
Assistant Examiner—Yemane Woldetatios
(74) Attorney, Agent, or Firm—Pillsbury Madison & Sutro LLP

(57) ABSTRACT

A method of measuring radio path quality values (SQ) in a digital mobile telephone network (PLMN) comprising at least one mobile station (MS). In the method, co-ordinates (XY) of a measuring point are determined and transmitted to the mobile telephone network (PLMN). A mobile test device (TS) measures the radio path quality values (SQ) from a downlink transmission path. The mobile telephone network (PLMN) measures the radio path quality values (SQ) from an uplink transmission path. According to the invention, the mobile test device (TS) sends the results from said measurements to the mobile telephone network (PLMN) essentially without delay. The mobile telephone network (PLMN) receives the measurement results (SQ) sent by the mobile test device (TS) and combines them with its own measurement results (SQ) and with the co-ordinates (XY) of the measuring point essentially without delay. The mobile telephone network (PLMN, OMC) has access to the combined measurement results (SQ, XY) as soon as possible, whereby the measurement results can be used for instance for controlling the location of the test device (TS).

19 Claims, 2 Drawing Sheets

TELEMETRIC MEASURING OF A MOBILE TELEPHONE NETWORK

This application is the national phase of international application PCT/F196/00683 filed Dec. 20, 1996, which designated the U.S.

BACKGROUND OF THE INVENTION

The invention relates to maintenance of quality in a mobile telephone network and especially to measurement of radio path quality and coordinates of a measuring point at an arbitrary point of the network.

FIG. 1 shows those parts of a mobile station system which are substantial for the invention. A mobile station MS communicates by radio with a base station BTS. One or several base stations BTS form together with a base station controller BSC a base station subsystem BSS, which again is connected to a mobile telephone network PLMN. The quality of the services produced by the network is monitored in a network management subsystem NMS and, to be precise, in an operation and maintenance centre OMC therein. The broken lines in FIG. 1 represent interfaces crossed by signals. Signals between the mobile station MS and the base station BTS propagate over air interface. The base station subsystem BSS communicates with the network subsystem over A interface. The management subsystem NMS communicates with the rest of the network over operation and maintenance interface O&M.

Signals do not always propagate straight between an antenna ANT of a base station BTS and a mobile station MS. The propagation of signals is interfered e.g. by attenuations caused by terrain form and buildings, reflections from even surfaces, such as walls of buildings. When signals arriving along different paths are summed in a receiver, it can be observed that the signal strength as a function of the distance of the receiver reaches several minimum points at distances of almost one wavelength from each other. The phenomenon is called Rayleigh fading, i.e. multipath fading. See e.g. Mouly-Pautet: "The GSM System for Mobile Communications", FIG. 4.19 with explanation. Other interfering factors are for instance narrow-band interferences from other mobile stations MS and broadband interferences from electric systems of cars or from lightnings, for instance. In addition, rain attenuates radio signals.

For monitoring the signal quality in a mobile telephone network, the following parameters among others are used: signal strength, bit error ratio BER and propagation time, on the basis of which a timing advance is formed. Within the scope of this application, these parameters associated with signal quality are combined to a concept 'signal quality' SQ. In the exemplifying GSM system, both the mobile station and the base station measure the above three parameters. The mobile station measures the signal strength in that base station where it is locked and, in addition to that, in adjacent base stations.

In general, parameters associated with signal quality are functions of location and also of time. One problem with mapping shadow regions conists of precision requirements with respect to location determination. Due to multipath fading, particularly, the signal strength varies considerably along a distance as small as one wavelength (about 30 cm). It is known to provide important measuring points of the network with special measuring telephones, which give the network feedback concerning signal quality. A problem with such fixed measuring telephones is that they can measure network parameters only at predetermined fixed points. For example, fixed telephones are not capable of measuring how a handover succeeds.

PCT Publication WO 93/15569 (PCT/US93/00579, Franza et al.) discloses a partial solution to the above problems. However, this solution involves certain problems. Firstly, the equipment is big and it is suggested to be located in a delivery van, for instance. This leads to the problem that radio path quality values of a network can be measured only at places which are accessible by a car or a delivery van. Indoor spaces of buildings, public vehicles, subway tunnels, pedestrian streets, recreational areas and water areas etc. are areas where no measurements can be performed by means of the system according to said WO Application. Another problem, which is not solved by the system according to this PCT Application, consists in combining measurement results from an uplink transmission path and a downlink transmission path. On page 8 of said WO Published Application, it says that "The data accumulated by the computer in the base station and the computer on the mobile platform may be stored and later combined". This later combining is problematic per se, because it requires additional calculation. The results from the uplink transmission path of a predetermined measuring device have to be combined with the results from the downlink transmission path of the same measuring device. This combining also causes delays in the maintenance of the network. If the measurement results from the uplink transmission path are poor, the user of the measuring device does not know that and cannot concentrate measurements on problematic places. Still another problem caused by a later combining is that it is not possible until after the combining to make a final decision on whether some measuring event involves something abnormal due to which the measurement result should be stored for a later analysis.

BRIEF DESCRIPTION OF THE INVENTION

Accordingly, it is an object of the present invention to measure parameters associated with radio path signal quality in a mobile telephone network and co-ordinates of corresponding measuring points and to transmit them to the operation and maintenance centre of the network at an arbitrary point of the network from a measurement station moving at an arbitrary speed. It shall be as simple as possible to combine the measurement results from a downlink transmission path and an uplink transmission path so that storage of data for an unnecessarily long time could be avoided.

The objects of the invention are achieved by methods and systems, which are characterized in what is set forth in the characterizing portions of the independent claims. The preferred embodiments of the invention appear from the independent claims.

The invention is based on an exact measurement of location of a mobile station, preferably by means of satellite positioning, and on using an intelligent controller connected to the system. According to the invention, quality parameters of the mobile telephone network are measured and these parameters are transmitted immediately to the mobile station network, where the measurement results from an downlink transmission path are combined with the measurement results from an uplink transmission path. In addition, coordinates of the measurement site are determined as exactly as possible. It is thus possible to conclude almost without delays, whether the measurement result is within the limits of predetermined standard values or not. While measurement results can be utilized for network planning in an arrangement according to the prior art, an arrangement according to the invention allows a utilization of measurement results for real time monitoring and maintenance of the network.

By combining the measurements of the uplink transmission path and the downlink transmission path immediately, even such an advantage is achieved that the information generated in this way can be utilized for the location control of a mobile measurement station. For instance, the measurement station can be commanded directly to remeasure a predetermined location or an information of a poor measurement result can be transmitted to it, in which case it can decide on a new measurement independently. On problematic sites, measurements can also be performed at different frequencies.

By combining the measurement results of the downlink transmission path and the uplink transmission path immediately, they can be used by the mobile telephone network, for instance by its operation and maintenance centre OMC, and a decision concerning permanent storage of the measurement results can be made as soon as possible, whereby unnecessary storage of unessential information and waste of memory space attached thereto are avoided. Thanks to an intelligent controller, storage of unessential information can be reduced and, on the other hand, such information can be produced which cannot be determined merely by means of a satellite positioning device and a mobile station.

According to a preferred embodiment of the invention, parameters measured and reported by a mobile station and a base station in a manner known per se, such as signal strength and/or bit error ratio, are used as quality values of the radio path. The advantage of this arrangement is that the mobile measuring equipment is very small, which makes a measurement possible anywhere.

According to another preferred embodiment of the invention, the measurement results within standard values can be removed and only results containing something abnormal can be stored. This avoids the use of memory space for measurement results the significance of which cannot be known until they have been combined with the results of the reverse direction,

BRIEF DESCRIPTION OF THE FIGURES

The invention will now be described in more detail by means of preferred embodiments with reference to the appended drawings on which.

DETAILED DESCRIPTION OF THE INVENTION

Figure 1:
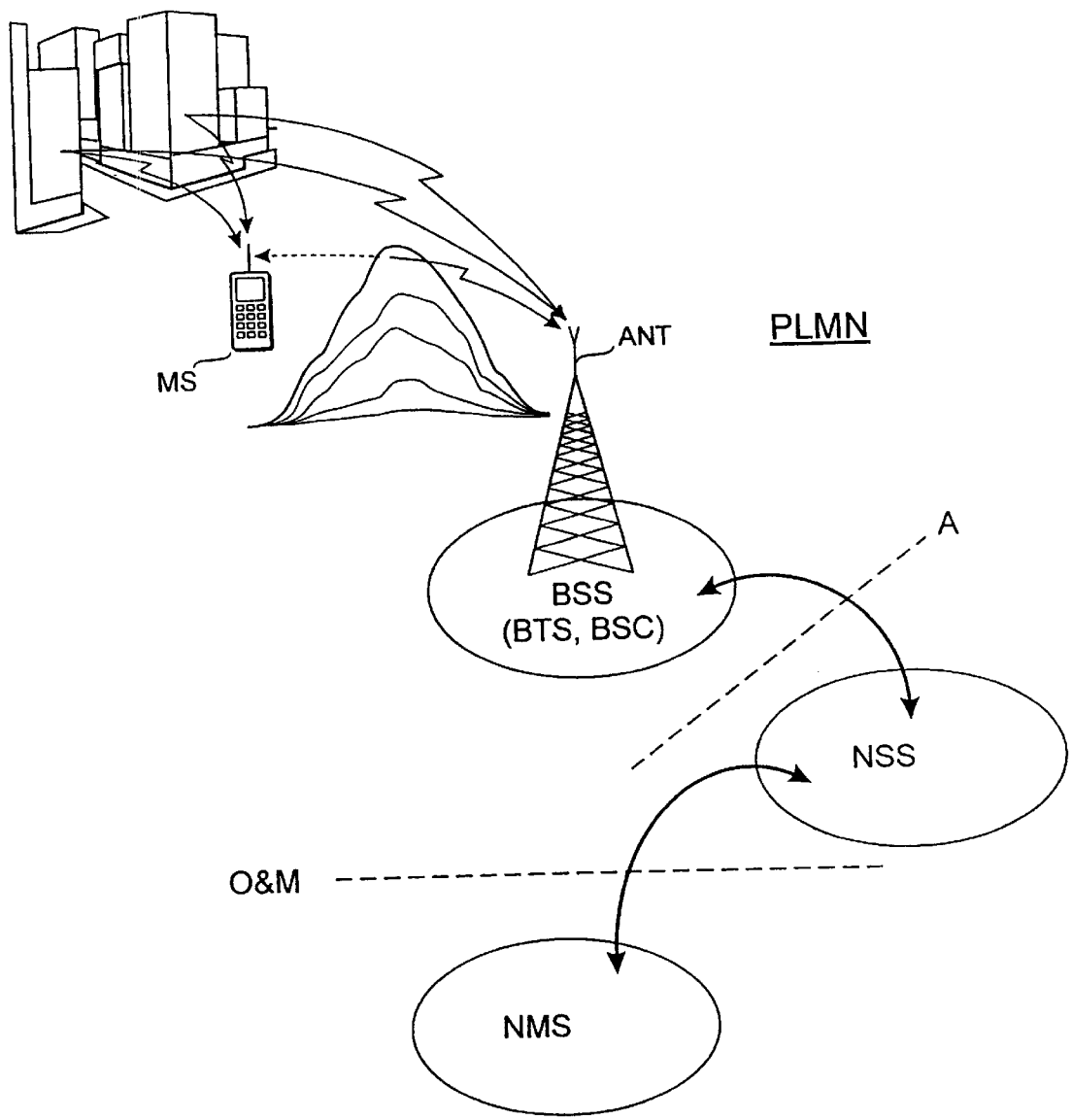
FIG. 1 shows those parts of a mobile station system which are substantial for the invention.
Figure 2:
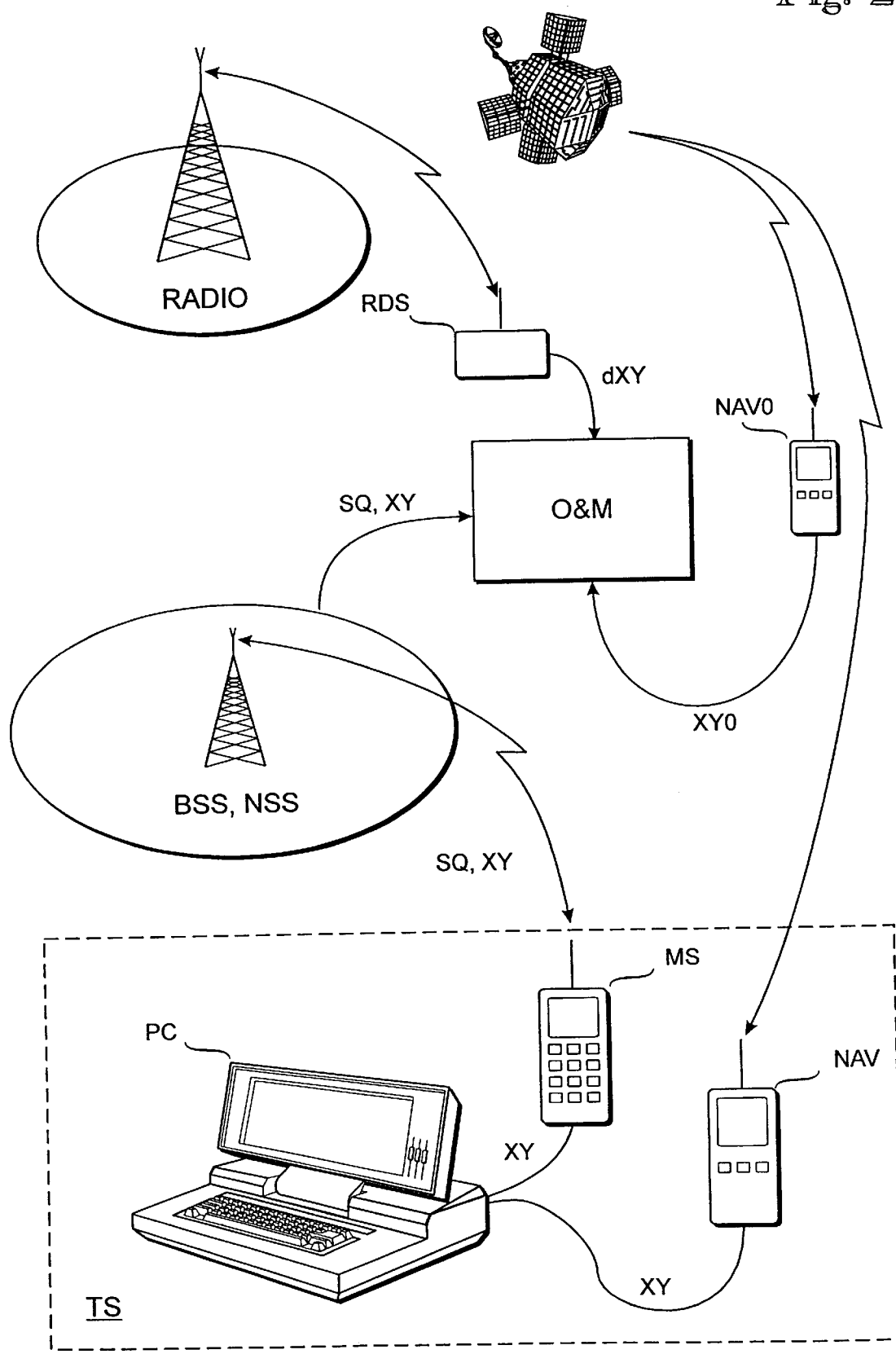
FIG. 2 shows a mobile measuring equipment according to the invention.

FIG. 2 shows an example of a mobile measuring equipment according to the invention. The measuring equipment TS (Test Station) according to the invention may consist, for instance, of a mobile station MS, a portable computer PC and a position determining device NAV (Navigation Equipment). The last-mentioned is for instance a positioning device GPS (Global Positioning System) a.k.a, a GPS receiver. The global positioning system GPS is based on satellites orbiting the earth and maintained by the United States, which satellites send a signal including a very accurate time. The location of the GPS device can be determined by measuring on the basis of propagation delay the distance to three satellites, the locations of which are known (on the basis of the co-ordinate data they have sent).

In principle, the capacity of the GPS would be sufficient for location determination with an accuracy of dozens of centimetres. For military reasons, the so-called civil code of the system has been impaired so that the error at location determination is 95% of the time below 100 m (at its worst as much as 300 m). A solution has been invented to this worsening, the solution being a differential GPS, briefly DGPS, based on the fact that base stations positioned at predetermined fixed locations (not to be mixed up with base stations of the mobile station system) measure their own locations according to the GPS, compare their measured locations with the locations known to be correct and send a corresponding correction signal. On the basis of GPS satellite data and this correction data, the DGPS receiver then determines the location with an accuracy of about 1 metre. In Finland for instance, the Broadcasting Corporation sends GPS correction data in a radio data system (RDS) signal of the VHF 3 network. See e.g. Sähkö&Tele no. 68, 5/1995 pages 15 to 17.

The location of the measuring equipment TS can be determined with an accuracy of differential GPS at least in three different ways. Firstly, the position determining device NAV belonging to the measuring equipment TS can be a DGPS device. Secondly, to the mobile telephone network PLMN can be connected a radio receiver RDS receiving a correction signal dXY e.g. from a broadcasting signal, if such a correction signal is transmitted within the area in question. Thirdly, the correction data can be determined in such a way that a GPS reference receiver NAV0 at a known fixed site produces its own location data XY0, which is compared to the known location of the reference receiver. The comparison results in the correction data dXY, which then can be combined with the location data XY transmitted by the measuring equipment TS according to the invention.

If it is not desirable to use the differential GPS for some reason or it cannot be used, the location data can be specified by a statistical analysis. If the consideration is restricted to concern transmitters in motion, the co-ordinates of these transmitters should come mainly from roads and streets. The co-ordinates of roads and streets can be obtained from electronic maps. Accordingly, when transmitted data is analyzed, it is possible to determine such a location correction information which produces the best correlation between the transmitted co-ordinates and the real co-ordinates of traffic routes.

For the measurement of signal quality SQ, it could be conceivable that the mobile station MS feeds the quality parameters it has measured to the computer PC and the computer PC forms a message from them and from the co-ordinates of the mobile station and sends this message e.g. as a short message or a data call to the mobile station network BSS. In an embodiment of the invention, the quality values of the mobile telephone network are measured by a separate measuring device (not shown) connected to the measuring equipment, which device is coupled to the computer PC for instance through serial interface. The measuring equipment TS can be simplified, however, by utilizing the fact that even a conventional mobile station MS according to the GSM system measures the three quality parameters mentioned above and reports them to the base station in connection with each call. Then it is enough that the mobile station sends to the network PLMN its co-ordinates XY, with which are combined the quality parameters SQ of the mobile telephone network, and these data are transmitted to the operation and maintenance centre O&M for post processing.

Implemented in this way, the system would produce too much and too poorly sifted information to be useful. As an indicative example, it is assumed that the measuring equipment TS is transported 10 km in a town and measurements are made at a resolution of 1 metre. Such a test generates 10.000 measurement data records, which may contain e.g. X and Y coordinates, date, time by the clock, signal strength, vehicle speed etc. Need of memory for such a material only is of the magnitude of 1 megabyte. Accordingly, it is preferable to restrict the generation of material at an as early stage as possible.

Generation of material can be restricted in the following manners, for instance:

quality parameters of the network are divided into predetermined classes, only changes with respect to the previous measurement are stored, only situations requiring some correction are stored.

Memory space can be saved by dividing the quality parameters of the network into predetermined classes. For example, if it is satisfactory to quantize the signal strength into four classes, only two bits are needed for separating the classes from each other. Another way of saving memory is to store only a change in a parameter with respect to the preceding one, not the whole parameter. X and Y co-ordinates and time are such parameters in which changes compared to preceding measurements are considerably smaller than the values themselves. Let us assume that 1 metre is set to be the resolution of location. Distances up to 256 metres can be determined by 8 bits, up to 65 kilometres by 16 bits and up to 16700 kilometres by 24 bits, respectively. In practice, any area thus requires a resolution of 24 bits (if the resolution is some multiple of 8 bits). On the other hand, a 8 bit resolution is mostly enough for storing changes in location, by which resolution the location can be determined within ±127 metres from the preceding measurement. In addition, only the situations to be corrected in some way can be stored, for example the signal strength or the bit error ratio is on the worse side of a predetermined threshold value.

Storage of unessential data can be avoided also in such a way that only situations in some way abnormal are stored. Then it is of advantage to store also events before an abnormal situation, e.g. a break in a call. This can be implemented in such a way that measurement data are stored in a ring buffer (not shown) formed of a volatile memory. When something abnormal occurs in a call, e.g. the call is interrupted or some of the quality values SQ of the signal falls below the predetermined threshold value, the data can be copied from the ring buffer into a more permanent memory, e.g. into a disk unit, or printed on paper.

No height information is obtained from the GPS system, at least for the time being. If height information is needed and the height is unambiguous, it can be obtained e.g. from an electronic map on the basis of the co-ordinates of the mobile station. In some cases it may be necessary to measure the height also in the mobile measurement station TS. Such a need may occur when the covering range of the mobile telephone network is mapped in tunnels, parking houses, etc. The height information can be obtained for instance by means of an electronic barometer connected to a computer PC. A calibration of the barometer can be implemented by a command from the computer, when the measuring equipment is at a site having a known height. The height information can also be calibrated in such a way that air pressure is measured shortly before a tunnel or a parking house, when the measuring equipment is at a site having an unambiguous height. Alternatively, the height information can be obtained for instance from the keyboard of the computer PC, e.g. in such a way that each one of the function keys F1 to F12 corresponds to one storey of a parking house.

The GPS system does not provide co-ordinates indoors, at least not in tunnels. It is, however, possible to determine co-ordinates of a subway tunnel on the basis of the routing of the train and the time by the clock.

If the measuring equipment according to FIG. 2 is implemented only to be used by the operator of the mobile telephone network, the additional price for the DPGS receiver with respect to a conventional GPS is not significant. Alternatively, the measuring equipment can be formed of such elements which move in the network area anyhow. Several different needs can then be met by the same measurements. For transport companies, for instance, it is more and more important to know where their vehicles are at each particular time. Systems are known which comprise a mobile station and a positioning equipment and transmit the location of the vehicle to the exchange in real time. One such system is the Pro2000 system of Rockwell International, USA. The operator of the mobile telephone network may utilize positioning information sent from such vehicles by reading the co-ordinates XY contained in the signal and the quality values SQ of the mobile telephone network. To make it possible for the operator of the network to know on which connections such information of co-ordinates can be expected, predetermined telephone numbers can be allocated for predetermined users for this purpose. It is also conceivable that predetermined phone numbers are allocated for devices sending conventional GPS information and other phone numbers for devices sending DGPS information in order not to add the correction signal dXY to the location data, which has already been corrected once.

It is obvious to one skilled in the art that the basic idea of the invention can be implemented in many different ways as the technique is developing. Accordingly, the invention and its embodiments are not restricted to the examples described above, but they can vary within the scope of the claims.

What is claimed is:

1. Method of measuring radio path quality values (SQ) in a digital mobile telephone network (PLMN) comprising at least one mobile station (MS), in which method:

co-ordinates (XY) of a measuring point are determined and transmitted to the mobile telephone network (PLMN);

a mobile test device (TS) measures the radio path quality values (SQ) from a downlink transmission path;

the mobile telephone network (PLMN) measures the radio path quality values (SQ) from an uplink transmission path;

characterized in that the mobile test device (TS) sends the results from said measurements to the mobile telephone network (PLMN) essentially without delay;

the mobile telephone network (PLMN) receives the measurement results (SQ) sent by the mobile test device (TS) and combines them with its own measurement results (SQ) and with the co-ordinates (XY) of the measuring point essentially without delay;

whereby the mobile telephone network (PLMN, OMC) has access to the combined measurement results (SQ, XY) as soon as possible.

2. Method according to claim 1, characterized in that the mobile telephone network measures the quality values (SQ) from the uplink transmission path by receiving a signal from the mobile test device (TS) and by forming from that signal the radio path quality values (SQ).

3. Method according to claim 1, characterized in that the mobile test device (TS) sends the quality values (SQ) from the downlink transmission path on the traffic channel of the mobile telephone network (PLMN).

4. Method according to claim 1, characterized in that the co-ordinates (XY) of the measuring point are determined with a receiver of a satellite positioning system (NAV).

5. Method according to claim 4, characterized in that GPS system is used as the satellite positioning system and that further in the method, correction data (dXY) of the GPS system is determined and combined with the co-ordinates (XY) of the measuring point.

6. Method according to claim 5, characterized in that the correction data (dXY) of the GPS system is determined by comparing the location (XY0) detected by the GPS receiver (NAV0) with the known location of this receiver and by determining the difference between the co-ordinates of these locations.

7. Method according to claim 5, characterized in that the correction data (dXY) of the GPS system is determined by receiving it with a broadcasting receiver (RDS).

8. Method according to claim 1, characterized in that further in the method:
  data records comprising the co-ordinates (XY) of the measuring point and the quality values (SQ) of the mobile telephone network are stored in a volatile storage means;
  the quality values (SQ) of the mobile telephone network are compared to predetermined threshold values; and
  in response to that at least one of the quality values (SQ) of the mobile telephone network falls below a predetermined threshold value, a predetermined number of data records are stored from the volatile storage means in a non-volatile storage means.

9. Method according to claim 8, characterized in that further in the method, the quality values (SQ) of the mobile telephone network are classified into a predetermined class and only the class indicating the quality value (SQ) is stored.

10. Method according to claim 8, characterized in that further in the method, a change in the quality values (SQ) of the mobile telephone network and/or in the co-ordinates (XY) of the measuring point with respect to the previous measurement is determined and only said change with respect to the previous measurement is stored.

11. Arrangement for measuring radio path quality values (SQ) in a digital mobile telephone network PLMN) comprising at least one mobile station (MS),
  the arrangement comprising a mobile test device (TS) arranged to measure the radio path quality values (SQ) from a downlink transmission path and means for determining co-ordinates (XY) of the test device; and
  the mobile telephone network (PLMN) being arranged to measure the radio path quality values (SQ) from an uplink transmission path;
characterized in that
  the mobile test device (TS) is arranged to send the results (SQ) from said measurements to the mobile telephone network (PLMN) essentially without delay;
  the mobile telephone network (PLMN) is arranged to receive the measurement results (SQ) sent by the mobile test device (TS) and to combine them with its own measurement results (SQ) and with the co-ordinates (XY) of the test device essentially without delay;
  whereby the mobile telephone network (PLMN, OMC) has access to the combined measurement results (SQ, XY) as soon as possible.

12. Arrangement according to claim 11, characterized in that it additionally comprises an intelligent controller (PC).

13. Arrangement according to claim 12, characterized in that means (NAV) for determining the co-ordinates (XY) of the measuring point comprise a GPS receiver.

14. Arrangement according to claim 13, characterized in that it further comprises means (RDS, NAV0, DGPS) for specifying the co-ordinates indicated by the GPS system.

15. Arrangement according to any of the claim 12, characterized in that it further comprises a memory means for storing the measurement data (SQ, XY).

16. Equipment according to claim 15, characterized in that it further comprises a ring buffer for storing the measurement data (SQ, XY) temporarily and a non-volatile memory means for storing the measurement data (SQ, XY) permanently in problematic situations.

17. Method according to claim 1, wherein the mobile test device sends the results from said measurements via the radio path whose quality values are measured.

18. Arrangement according to claim 11, wherein the mobile test device sends the results from said measurements via the radio path whose quality values are measured.

19. Method according to claim 1, wherein the quality values of the mobile telephone network which are combined in the mobile telephone network are used by the mobile telephone network for controlling the location of the test device.

* * * * *